Feb. 19, 1963
E. W. VERES ET AL
3,078,007
BOWL FOR AN AIRLINE LUBRICATOR
Filed Jan. 12, 1960
2 Sheets-Sheet 1
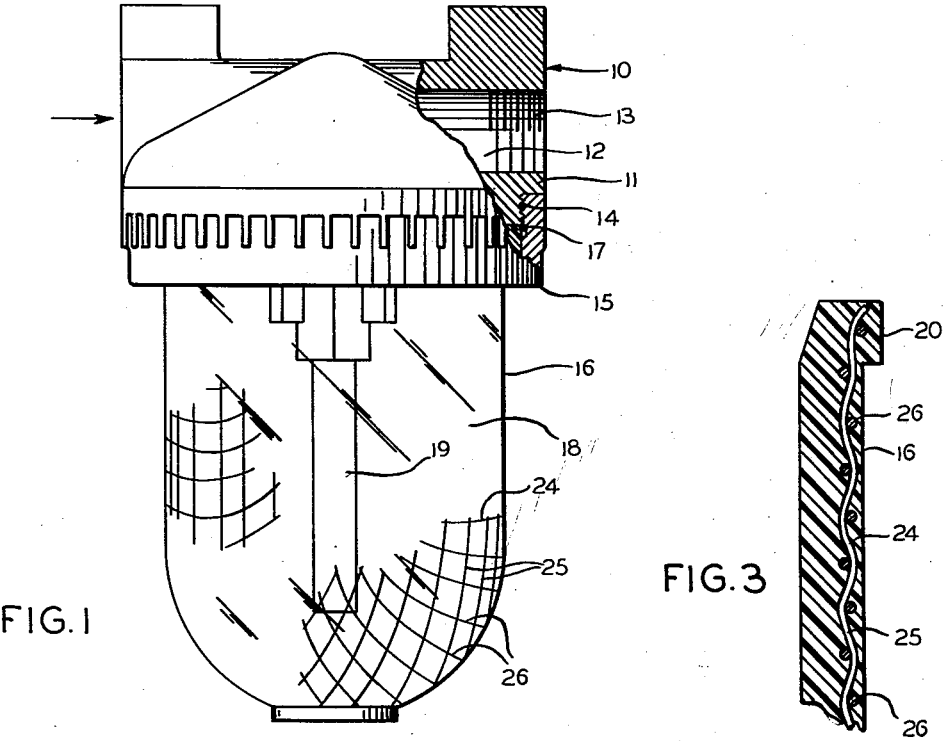
FIG.1
FIG.3
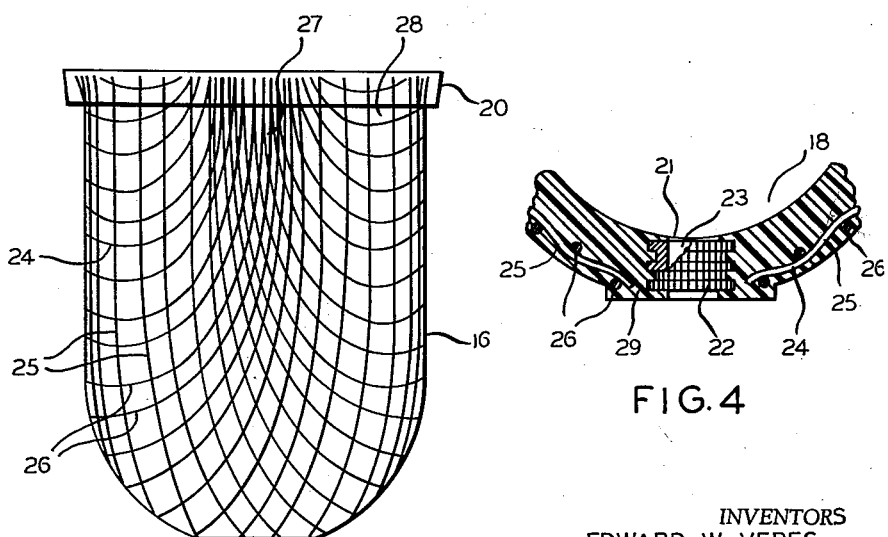
FIG.2
FIG.4
INVENTORS
EDWARD W. VERES
HAMLIN S. BROWN
BY
*John W. Graham*
ATTORNEY

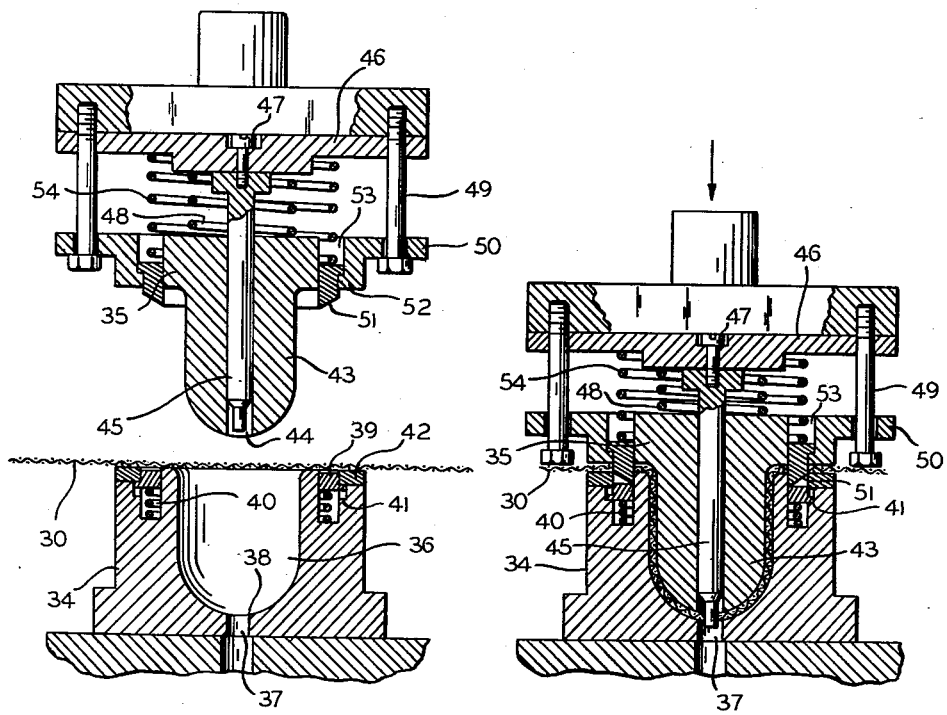
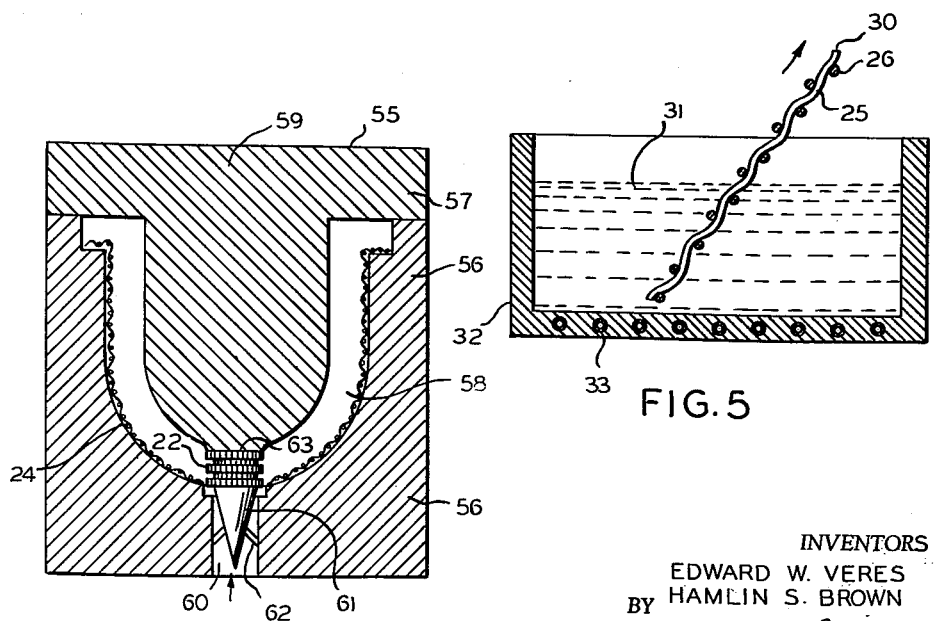

United States Patent Office 3,078,007
Patented Feb. 19, 1963

3,078,007
BOWL FOR AN AIRLINE LUBRICATOR
Edward W. Veres, Arlington Heights, and Hamlin S. Brown, Barrington, Ill., assignors to Safety-Crafters Corporation, Palatine, Ill., a corporation of Illinois
Filed Jan. 12, 1960, Ser. No. 2,054
4 Claims. (Cl. 220—71)

This invention relates to a bowl structure, and more particularly to a bowl that defines a pressurized reservoir for use with devices such as airline lubricators and the like.

While bowls incorporating the present invention are useful in a variety of environments, particular utility exists wherever the chamber or reservoir defined by the bowl is pressurized, and an airline lubricator typifies this usage. Therefore, considering an airline lubricator in greater particularity, it includes a housing having a flow passage therethrough that is adapted to be inserted in an airline delivering air from a pressurized source thereof to a utilization device such as an air hammer, stapling machine, etc. Depending from the housing is a bowl that defines a chamber or reservoir containing a lubricant delivered from the reservoir into the housing passage and consequently into the air stream flowing to the utilization device for lubricating at least certain of the moving parts thereof.

In modern lubricators, the liquid lubricant in the reservoir is fed into the air stream as the result of a pressure differential defined between the interior of the reservoir and the area in the housing passage that is connected with the reservoir through a feeder, such as a sintered metal rod. The interior of the reservoir is maintained at approximately line pressure through a small opening in the housing that connects the upstream side of the passage with the reservoir, and a low pressure area is created in the housing passage as a result of a restriction therein adjacent the feeder and downstream of the small opening, which lowers the pressure by increasing the flow velocity. Whenever air is flowing through the housing passage and to a utilization device, the line pressure within the reservoir forces the liquid lubricant through the feeder and into the low pressure area in the passage where it is picked up by the air stream. Further details of an airline lubricator of this type are found in Johnson patent, No. Re. 24,232.

Desirably, these reservoir-defining bowls are made of a generally transparent or at least a translucent material so that the level of the liquid lubricant present in the reservoir can be seen readily because not only is it necessary to always maintain a supply of lubricant in the reservoir, but for proper lubrication it is necessary to maintain the level of the lubricant within predetermined limits since both over and under-filling of the reservoir result, respectively, in excessive and insufficient lubrication of the utilization device served by the lubricator. Therefore, there has been a considerable tendency to make such bowls from one of the synthetic inorganic resin plastics having the requisite visibility characteristics. However, this has created a serious problem because of the high pressure (approximately 90 pounds per square inch) present in the reservoir which occasionally causes the bowls to shatter, with pieces thereof being accelerated at projectile velocities which thereby endangers personnel. Such an explosion of a bowl may occur for a number of reasons, among the most important of which are from undetectible defects in the bowl as originally manufactured, and from bowl deterioration caused by certain solvents which may be present in some lubricants contained within the bowl reservoir.

Because of these inadequacies, some manufacturers have housed the resin plastic bowls in metal shields that, in encapsulating the bowls, effectively contain the particles which would otherwise be propelled if the bowl shatters. It is readily apparent that this expedient substantially destroys the purpose and utility of the transparent bowl because an effective encapsulation thereof cannot be attained unless the metal shield is substantially imperforate and therefore must be removed to check the contents of the bowl, which not only is an inconvenience but also magnifies the inherent hazard to the workman.

In view of these considerations, an object of the present invention is to provide a generally transparent bowl adapted for use with airline lubricators and the like wherein such bowl defines a pressurized chamber, and which obviates the problems discussed while retaining substantially all of the advantages of visual monitoring of the contents of the chamber. Another object of the invention is in the provision of a reinforced bowl of the character described that will not shatter in the event that the bowl explodes as a result of a defect or excessive pressure being present therein.

Still another object is that of providing a bowl that is reinforced with a network of strands or filaments that are embedded within the bowl but are oriented along the outer surface thereof so as to effectively contain the walls of the bowl and thereby prevent shattering thereof. Yet another object is to provide a reinforced resin plastic bowl of the type described, in which the reinforcing network comprises a plurality of interconnected strands, at least certain of which are maintained in a condition of stress which lends rigidity thereto and augments the containing function supplied thereby to the walls of the bowl.

A further object of the invention is that of providing a method of fabricating a bowl of the character described. Still a further object is in the provision of a method of making a reinforced resin plastic bowl adapted for use as the pressurized reservoir in airline lubricators and the like, and in which the reinforcing network is drawn into a stressed, bowl-shaped configuration from a flat wire mesh and is disposed and maintained in a position along the outer surface of the bowl during the subsequent fabrication thereof. Additional objects and advantages of the invention will become apparent as the specification develops.

Embodiments of the invention in terms of structure and method of making the same, are illustrated in the accompanying drawings, in which—

FIGURE 1 is a side view in elevation of an airline lubricator having a bowl embodying the present invention, in which a portion of the lubricator structure is broken away and is shown in section; FIGURE 2 is a side view in elevation of a bowl embodying the invention; FIGURE 3 is an enlarged, broken vertical sectional view of the upper end portion of the bowl wall; FIGURE 4 is an enlarged, broken vertical sectional view of the lower end portion of the bowl wall; FIGURE 5 is a vertical sectional view illustrating a step in the fabrication of the reinforcing element; FIGURE 6 is a vertical sectional view illustrating the relative orientation of components exemplifying apparatus which may be used in the formation of the reinforcing element in preparation for drawing the same; FIGURE 7 is a vertical sectional view similar to that of FIGURE 5, but showing the step of drawing the reinforcing element into its bowl-shaped configuration; and FIGURE 8 is a vertical sectional view of an injection mold used in casting a bowl, and in which the reinforcing element is shown in proper position within the mold for the injection of the resin plastic thereinto.

The typical environment for the invention, as illustrated in FIGURE 1, is an airline lubricator designated in general with the numeral 10. The lubricator has a housing 11 provided with a flow passage 12 extending therethrough that is threaded at each end, as shown at 13, for connection in a conduit through which air flows from a pressurized source to a utilization device, neither of which are shown. The housing 11 is threaded at 14 so as to receive thereon a nut 15 that is used in releasably securing a bowl 16 to the housing. Usually, a seal or washer 17 will be interposed between the adjacent surfaces of the housing and bowl so as to define an air-tight connection therebetween.

The bowl 16 defines a chamber or reservoir 18 therein, and extending downwardly into such reservoir is a hollow tube 19 communicating at its upper end with a sintered metal rod that projects into the passage 12. Such rod and the tube 19 define a feeder adapted to deliver liquid lubricant from the reservoir 18 and into the passage 12 where it is picked up by the air flowing therethrough. Such air flows through the passage 12 in the direction of the arrow, or left to right as viewed in FIGURE 1, and the upstream side of the passage communicates with the reservoir 18 through a small opening (not shown). When air flows through the passage, the line pressure, which is usually about 90 pounds per square inch, is present in the reservoir 18 because of the communication thereof with the passage through such small opening. The projection of the sintered rod feeder into the passage 12 defines a restriction so that the flow velocity at that location is increased with a consequent decrease in the pressure. Therefore, lubricant is forced upwardly through the tube 19 and through the sintered rod because of the pressure differential that exists between the interior of the reservoir and point of communication of the sintered rod with the passage 12. In some constructions, the passage 12 may be restricted in cross section in addition to the restriction thereof that is defined by the projection of the sintered rod thereinto. Further details of a lubricator of such construction may be found in Johnson patent, No. Re. 24,232, referred to hereinbefore.

In the present invention, the bowl 16 is transparent in the sense that the level of the liquid lubricant contained within the reservoir 18 may be visually determined. That is, the bowl need not be transparent in the sense of window glass, and in many instances bowls having translucence without transparency can be used to readily see the liquid level within the reservoir. Bowls that have proven quite satisfactory have been formed of a synthetic inorganic resin plastic material such as Bakelite C–11, and is a molded product preferably annealed to relieve localized stresses, etc.

At its upper end, the bowl 16 is open and is provided with a laterally extending annular flange 20 adapted to cooperate with the nut 15 in securing the bowl in proper position with respect to the housing 11. The bowl 16 is otherwise closed, except that at its lower end it is provided with an opening 21 that serves as a sump or drain for the reservoir 18, and in certain applications such opening provides a means for automatically filling the reservoir through a system designed for such purpose. Embedded within the bowl 16 in coaxial relation with the opening 21 is a collar or connector 22 having a port 23 therethrough coaxial with the opening 21. The connector 22 may be roughened or serrated exteriorly and provided with alternate lands and grooves to assure a good interconnection with the material comprising the surrounding wall of the bowl, and usually the port 23 of the connector will be threaded so as to permit coupling of a plug, drain valve or other device thereto.

Embedded within the walls of the bowl 16 is a reinforcing element 24 that comprises a plurality of longitudinally extending strands 25 and a plurality of perimetrically extending strands 26. Such strands are respectively secured to each other; or more particularly, each of the longitudinally extending strands is secured to substantially all of the transversely extending strands and, in a similar manner, each of the transversely extending strands is secured to substantially all of the longitudinally extending strands. As will be described in greater detail hereinafter, the reinforcing element 24 is formed from flat mesh or fabric stock as, for example, wire fabric of approximately ¼″ x ¼″ mesh, with the strands 25 and 26 being approximately sixteen gauge. The reinforcing element may be galvanized steel wire, and the various strands secured to each other by brazing, as for example, by coating the strands with copper.

The reinforcing element 24 is disposed along the outer surface of the bowl 16 for it has been found that this positioning of the element more effectively contains the bowl against shattering in the event that it breaks with an explosive force as a result of latent defects, defects that develop as a result of bowl deterioration as where solvents for the plastic material come in contact therewith, or for any other reason. Additionally, substantially all of the strands 25 and 26 are in a stressed condition because of the deformation of the flat fabric stock into the relatively deep bowl-shaped configuration, and such stressing of the strands appears to augment the containing force otherwise inherently applied to the bowl by the reinforcing element.

As is seen best in FIGURE 2, the strands are concentrated in number at a plurality of restricted areas 27 spaced from each other about the generally cylindrical surface of the bowl adjacent the upper end thereof. The strands 24 and 25 in the areas 27 have a generally longitudinal orientation or, stated another way, tend to merge into generally vertically extending lines in such areas. In the structure shown, there are four such areas 27 of concentration, and these are spaced from each other at substantially 90° intervals. It will be evident that the various areas of concentration are spaced or separated from each other by areas 28 in which the spacing defined between the various strands is substantially normal. It is believed that the specific disposition of the strands, and particularly of the generally perimetrically extending strands 26 wherein such strands have arcuate or loop-shaped configurations extending from one area of concentration 27 to another and curve downwardly therebetween, affords greater strength and gives the bowl greater shatter-proof characteristics than if the strands were straight because such areas of concentration serve as anchors for the strands, and the force pattern of each strand has both longitudinal and transverse components varying one to another incrementally along the length of such strands between the anchor points thereof.

The reinforcing element 24 is substantially continuous and terminates at the upper end of the bowl along the flange 20 thereof. However, the reinforcing element does have a centrally disposed opening 29 formed in the lower end thereof for accommodating the collar 22 and associated ports 21 and 23. It is also clear that the strands of the reinforcing element are interwoven, as is shown most clearly in FIGURES 3 and 4.

Referring to FIGURES 5 through 8 in particular, the method of fabricating the bowl 16 will now be described. In accordance with such method, a properly sized piece of wire fabric 30 will have the strands 25 and 26 thereof secured to each other as heretofore described, as by means of brazing which may be accomplished by coating the galvanized steel wire strands of the fabric with copper. An exemplary operation of this type is shown in FIGURE 5, wherein the fabric piece 30 is dipped into a copper solution 31 held within a container 32 that is heated as by means of a resistance heating element 33 embedded in a wall thereof. After the fabric piece 30 has been dipped into the solution 31 and removed therefrom, the copper solidifies and consequently joins the adjacent intercrossed strands one to another.

Thereafter, the fabric part 30 is located over the female section 34 of a die having a corresponding male section 35. The female section 34 has a cavity or socket 36 therein of generally bowl-shaped configuration, and a vertically oriented passageway 37 defining a cutting edge 38 along the inner surface of the cavity 36 is in communication therewith. Circumjacent the cavity 36 at the upper end thereof is a cutting block or backing member 39 that is vertically movable through a limited distance, and is biased upwardly by a helical spring 40. Downward movement of the member 39 is limited by an annular shoulder 41 provided by the female section 34, and upward movement is similarly limited by a retaining element 42 secured to the female section 34.

The male section 35 is equipped centrally with a bowl-shaped prong or former 43 adapted to be received within the cavity 36 and corresponding dimensionally thereto. Reciprocable through a central passage 44 provided in the former 43 is a punch 45 adapted to enter the passage 37 in the female section and to cooperate with the cutter 38. The punch 45 is secured to a driving member 46 by a cap screw 47, and the driving element is resiliently biased away from the male section 35 by a coil spring 48 that respectively seats at the opposite ends thereof against the driver 46 and male section 35. However, the driver and male die section are held together by means of bolts 49 which extend through openings provided in a flange 50 extending laterally outwardly from the central portion of the male section 35, and are threadedly received within openings therefor in the driver 46. The bolts 49 are freely movable through the openings therefor in the flange 50 and are effective to limit movement of the male section 35 and former 43 in a direction away from each other, but do not inhibit relative movement therebetween toward each other.

Circumjacent the former 43 at the upper end thereof is an annular cutter 51 in alignment with the cutter block 39 provided in the female die section 34. Downward movement of the cutter 51 is limited by a shoulder 52 formed in the male section, but the cutter is free to move upwardly through a limited distance within an annular space 53 against the biasing force of a helical spring 54 that seats at one end against a cutter 51 and at its other end against the driving member 46. Thus, the male die section 35 is movable relative to the driving element 46 but is resiliently connected therewith, and the cutter 51 is free to move relative to both the male section 35 and driving element 46 but is resiliently coupled to the latter.

In forming the bowl-shaped reinforcing element 24 from the fabric part 30, the part is placed over the cavity 36 (as shown in FIGURE 6), and the driving member 46 is then moved downwardly toward the fabric part 30 and female die section 34. As the driving element 46 continues to move downwardly, the former 43 engages the fabric part 30 and pushes the same into the cavity 36, as shown in FIGURE 7. During this same movement, the punch 45 is brought into engagement with that portion of the fabric part 30 that extends over the passage 37, and the punch in cooperating with the cutter 38 removes a restricted annular portion from the part 30; and such removed portion corresponds to the opening 29 in the reinforcing element as heretofore described, and which is shown in FIGURE 4. Also, the cutter 51 moves downwardly into engagement with the fabric part 30 disposed over the cutter block 39, and severs the part 30 along the entire length of the block 39, as shown in FIGURE 7. Consequently, in this one operation, the flat wire fabric part 30 is drawn into the deep bowl-shaped configuration of the reinforcing element 24, has the opening 29 formed therein, and has the excess material trimmed therefrom. It is clear that when the male and female die sections are separated, the thusly formed reinforcing element may be removed from the die.

Next, the reinforcing element 24 is positioned within an injection mold 55 having a base or female section 56 and male section 57. The female section 56 is provided with a bowl-shaped cavity 58 therein corresponding in configuration to the contour of the bowl 16. The male section 57 is provided with a bowl-shaped mating part 59 adapted to be received within the cavity 58 and defining a space therebetween substantially equal to the thickness of the wall of the bowl 16. The material from which the bowl is formed is injected into the mold cavity in a liquid state in the direction of the arrow in FIGURE 8, through a runner or passage 60. A cone-shaped guide and support 61 is positioned within the runner 60, and is held in position by members 62. The cone-shaped element 61 extends upwardly and into the cavity 58, and is adapted to have the collar 22 seated thereon. Thus, the cone constrains the collar 22 against downward movement and effectively closes the lower end of the port 23 therethrough. In a similar manner, the part 59 is equipped at its lower end with a centrally disposed protuberance 63 that seats against the upper end of the collar 22 and constrains the same against upward movement, and effectively closes the upper end of the port 23 thereof.

In the molding operation, the reinforcing element 24 is maintained in a predetermined position with respect to the components of the injection mold, and therefore with respect to the bowl 16 formed therein. In the specific arrangement, the reinforcing element is maintained in substantially contiguous relation with one of the mold parts 56 or 57, and specifically is maintained in substantially contiguous relation with the outer surface of the cavity 58. Therefore, after the plastic material has been injected into the mold and has been cured, the reinforcing element 24 will be located along the outer surface of the bowl 16. Such positioning of the reinforcing element is established initially by placing the same within the cavity 58, and it is thereafter maintained in such position by injecting the liquid material (which enters the mold under tremendous pressures) uniformly about and over the annular edge defining the opening 29 in the reinforcing element. In this manner, the material shooting into the cavity tends to press the reinforcing element 24 outwardly toward the wall of the cavity 58, whereby the maintenance of the desired disposition of the reinforcing element is achieved.

This is important for it has been found that the injection of the liquid plastic material into the cavity can readily disturb the position of the reinforcing element, and can also crumble the same into one end of the cavity. Further, it is believed that the configurations of the strands 25 and 26 of the reinforcing element results in a coaction with the liquid material entering the mold cavity so as to permit attainment of the desired positioning of the reinforcing element. In this respect, it is theorized that the liquid material tends to slide upwardly over the strands in the areas of concentration thereof, thereby reducing the total upward force initially active against the reinforcing element and which tends to collapse or compact the same toward the upper end of the mold cavity. At the same time, a sufficient volume of the liquid plastic penetrates the reinforcing element through the alternate areas of lesser concentration of the strands, and provides an anchorage tending to hold the reinforcing element in the proper position.

After the required amount of liquid plastic material has been injected into the mold to form the bowl 16, the material is permitted to cure or solidify within the mold and such curing is rapidly accomplished because, as is well known, the molds have heat extracted therefrom by a cooling means, usually constituting a flow of cool water through passages provided for that purpose but which are not illustrated since they form no part of the instant invention. Desirably, the bowl 16 after removal thereof from the mold 55 is annealed to eliminate any localized conditions of stress that may be present in the plastic material. In tests that have been made in accordance with the present invention, it has been found that the bowls are able to withstand substantially greater pressures without cracking than ordinary bowls which are not reinforced with the element 24, thereby providing a much greater margin of safety. Additionally, when bowls incorporating the present invention are intentionally broken by applying sufficiently large pressures to the reservoir 18 thereof, the bowls break without shattering, and it has been noted that such breaks take the form of longitudinally extending cracks that permit relatively rapid reduction of the pressure within the bowl reservoir.

While in the foregoing specification embodiments of the invention both in terms of structure and method of making the same have been set forth in considerable detail for purposes of making a complete disclosure thereof, it will be apparent to those skilled in the art that numerous changes may be made in such details without departing from the spirit and principles of the invention.

We claim:

1. A structure adapted for use as the pressurizable reservoir of an airline lubricator or the like, comprising a bowl constituted of a molded plastic material and defining a longitudinally extending chamber adapted to be pressurized, and a stranded-mesh reinforcing element embedded within said bowl and including a plurality of interconnected strands defining a geometric pattern in which said strands are concentrated in number at spaced apart locations about said bowl and have a generally longitudinal disposition at such locations, substantially all of said strands at such locations curving longitudinally and laterally therefrom with certain of the strands curving laterally in one direction and others curving laterally in the opposite direction both toward the next adjacent location of concentration.

2. The structure of claim 1 in which said bowl is generally transparent.

3. The structure of claim 1 in which said reinforcing element is a porous mesh and in which said interconnected strands are rigidly affixed to each other at their respective points of contiguous relation.

4. The structure of claim 1 in which at least certain of said strands are in a condition of stress and thereby augment the containing force otherwise applied to said bowl by said reinforcing element.

References Cited in the file of this patent

UNITED STATES PATENTS

| | | |
|---|---|---|
| Re. 24,232 | Johnson | Oct. 30, 1956 |
| 2,575,339 | Fitzgerald | Nov. 20, 1951 |
| 2,594,693 | Smith | Apr. 29, 1952 |
| 2,797,178 | Noyes et al. | June 25, 1957 |
| 2,835,404 | Andrus | May 20, 1958 |
| 2,915,425 | Biedelach et al. | Dec. 1, 1959 |
| 2,921,649 | Wilkerson | Jan. 19, 1960 |
| 2,933,214 | Douyard | Apr. 19, 1960 |
| 2,965,220 | Naul | Dec. 20, 1960 |